May 17, 1966 H. E. BESTE 3,251,933

THREE-DIMENSIONAL TELEVISION SYSTEM

Filed Oct. 31, 1962 2 Sheets-Sheet 1

INVENTOR.
HAROLD E. BESTE
BY William V. Pesce
ATTORNEY

May 17, 1966 H. E. BESTE 3,251,933

THREE-DIMENSIONAL TELEVISION SYSTEM

Filed Oct. 31, 1962 2 Sheets-Sheet 2

INVENTOR.
HAROLD E. BESTE

BY William V. Pesce
ATTORNEY

United States Patent Office 3,251,933

Patented May 17, 1966

3,251,933

THREE-DIMENSIONAL TELEVISION SYSTEM

Harold E. Beste, Verona, N.J., assignor to Vare Industries, Inc., Roselle, N.J., a corporation of New Jersey Filed Oct. 31, 1962, Ser. No. 234,384
2 Claims. (Cl. 178—6.5)

This invention relates to an improvement in television systems whereby it is possible to transmit and receive images in perspective or in apparent third dimension (that is, the so-called stereoscopic type of image), in either black and white or in conjunction with a sequential additive type color image producing system.

In the present standard television transmission of black and white images, optical images of the subject matter to be transmitted are focused upon a light responsive electrode in a television pickup or camera tube and are directed along a single optical path. Naturally, a plurality of cameras are actually used in a studio and all may be simultaneously producing television image signals. When the optical images are focused upon the camera tube they produce electrostatic charge images which, in turn, are converted to video signals within the camera tube and these signals are transmitted to a remotely located receiver where they are employed and used to produce an optical light image on the screen of a television receiving tube. In present black and white television transmission, the horizontal deflection frequency or line frequency is of the order of 15,750 cycles per second whereas the field or vertical deflection frequency is of the order of 60 cycles per second. Since double interlacing is usually employed, two fields are required for each complete picture or image frame. The frame frequency presently standardized is 30 per second. Each complete picture or image or frame is, therefore, composed of approximately 525 picture lines whereas each television field includes half this number or 262½ lines.

In conventional three-dimensional optical systems the TV screen is generally split into two halves to portray the left and right images side-by-side, thereby reducing the horizontal resolution to less than half. Further, in such a display the left and right images fail to converge properly due to the non-linearities that exist in almost all horizontal deflection systems.

In accordance with the present invention, it is proposed to direct light to the light responsive electrode of a camera tube along two different optical paths and to provide an arrangement whereby the optical images which are directed upon the camera tube are produced as a result of the transmission of light along these two paths alternately. The image signals which are produced by the camera tube will then be alternately representative of two displaced images of the object area televised, the degree of displacement being such as will produce substantially normal stereoscopic or third dimension effects. These video signals are then amplified and transmitted to a remotely located receiver where they are utilized for the production of optical light images on a single fluorescent or image surface. In order that the desired stereoscopic effect may be obtained, it is necessary that the individual eyes of the observer see only the proper images and accordingly, provisions are made at the receiver whereby each eye of the observer sees images which correspond to the light transmitted along a certain one only of the two optical light paths at the transmitter. For his purpose a composite three-dimensional video signal is routed to the proper display tube by special switching circuits to turn on the appropriate tube and view from a binocular type viewing hood.

The present invention may also be used in conjunction with color television by including, at the transmitter, a color filter assembly for separating the component colors in order that signals representative of the component colors may be transmitted sequentially.

It is, therefore, one object of the invention to provide an improved type of three-dimensional television system.

Another object of the invention is to provide a three-dimensional television system which provides full horizontal resolution capability.

Another object of the invention is to provide a three-dimensional television system which displays a minimum effect resulting from non-linearity in the horizontal deflection system.

Other objects and advantages will become apparent from a reading of the specifications and a study of the accompanying drawings and wherein.

Figure 1:
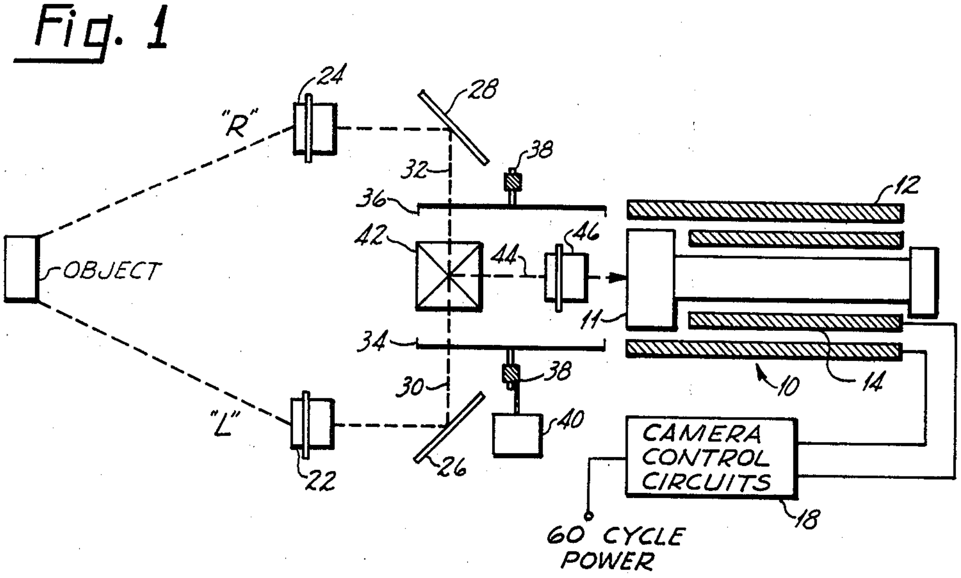
FIG. 1 shows diagrammatically a three-dimensional image producing system according to one embodiment of the invention.

Now referring to the drawings and more particularly to FIG. 1 thereof, there is shown a television transmitter including a television pickup or camera tube 10 preferably of the Orthicon type using a magnesium type target. The details of the camera tube are not shown but it includes all of the deflection and electro-magnetic focusing currents, video amplifiers and circuitry found in conventional image orthicon cameras. The television camera tube 10, the focusing coil 12 and the deflecting coils 14 are supplied with energy from various camera control circuits of known variety, all of which are represented schematically at 16. The image signals produced by the television camera tube are directed to the television transmitter apparatus, not shown, which increases the intensity of the image signals and which mixes with the image signals the necessary synchronizing signals, blanking signals, etc., that are necessary for successful transmission and reception of the television images. These signals are then transmitted, preferably by means of a radio frequency carrier, in order that they may be received by a remotely located television receiving system.

Associated with the television camera tube is an optical system which comprises a right and left imaging lens 22 and 24 respectively, for imaging light from a given object on to a pair of silvered angularly oriented reflecting mirrors 26 and 28. The light paths 30 and 32 as reflected by the silvered mirrors are each intercepted and intermittently interrupted by rotating shutters 34 and 36 respectively, the said shutters being mounted upon a common shaft 38 which is in turn driven by a synchronous motor 40. The power source for the motor is the same as that for the camera control circuits 18 so that a definite frequency relationship exists between them and a constant phase characteristic is maintained between motor, shutter and camera control circuits.

Figure 4:
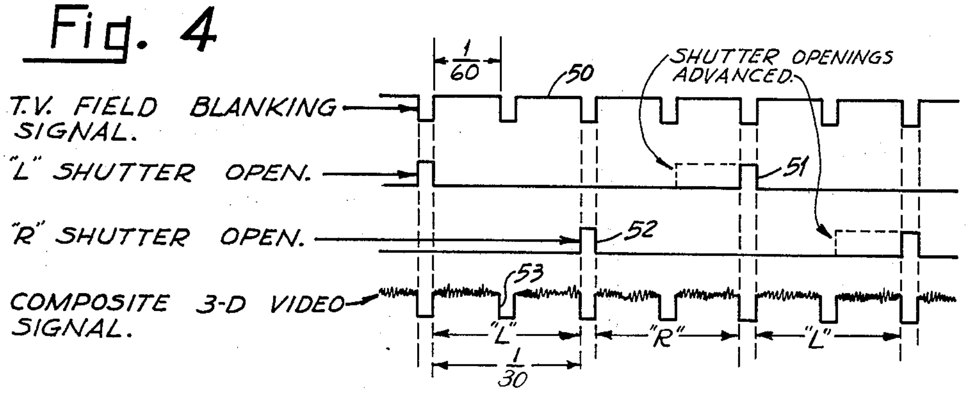
FIGS. 4 and 5 show timing diagrams for shutter operation and for gating the receiver for proper viewing of the televised images.

The light paths 30 and 32 are each made to intercept a prism 42 to produce a common light path 44 which is imaged upon the light responsive surface 11 of image tube 10 by relay lens 46. However, in this particular embodiment the light paths 30 and 32 are intermittently images upon the image tube 11 because of their intermittent interception by shutters 34 and 36. Since the television sync generator is also locked to the power line frequency, accurate phase relationship is established between the storage of the images and television scanning rates. The timing diagram, FIG. 4, shows exposure time to be equal to the blanking period. However, this can be increased to approximately 1/60 second by advancing the shutter openings in 34 and 36 so that the image storage follows the scanning beam of the second field. In this manner left and right hand images are stored and erased independently on the same image orthicon. With further reference to FIG. 4, the timing sequence is as follows: the shutter rotates at such an angular velocity as to permit one rotation to occur every 1/15 second, however, because the shutter openings are each displaced with respect to each other 180°, then there will be exposure or light images upon the image tube at the rate of 1/30 of a second. The shutter openings for left and right shutters are shown diagrammatically by curves 51 and 52 respectively. It can be seen that the openings each correspond in phase to the blanking diagram 50 as generated by the TV control generator 18. The composite video three-dimensional signal developed from left and right images are schematically shown by curve 53, the curve showing how exposure is established during a complete timing interval for left and right images, namely 1/15 second period.

The system as described above can be made to be compatible with present day standard two-dimensional operation of television receivers. This may be accomplished by first stopping the synchronous motor 40 and permitting either the left or right light paths to be transmitted, the sutters being opened to one of the paths while blocking the transmission of light from the other path.

Figure 2:
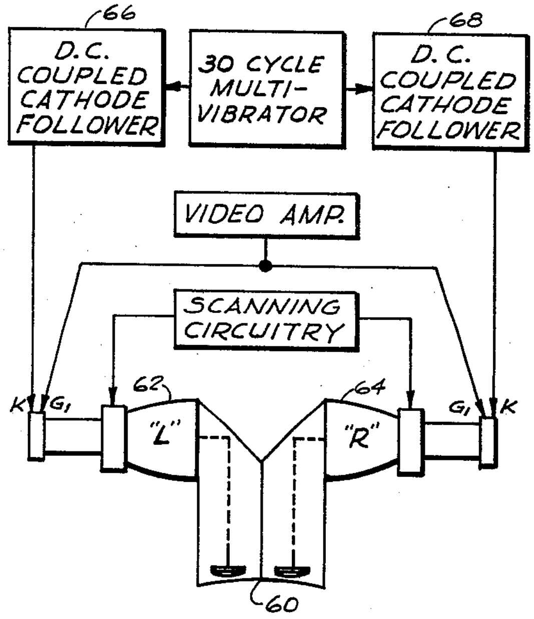
FIG. 2 shows schematically the receiving system for displaying in three-dimension the televised images.
Figure 3:
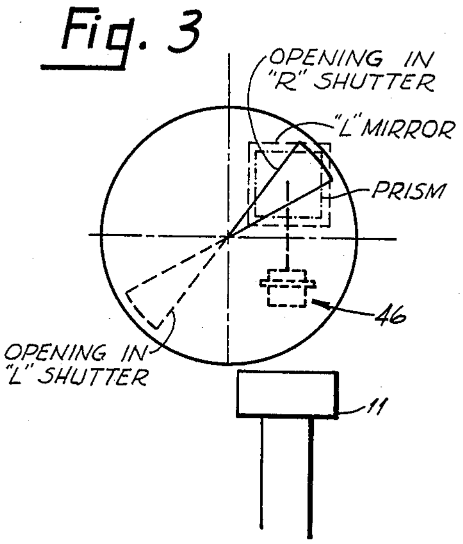
FIG. 3 shows details of the shutter mechanism for alternately permitting images to be placed on the image pickup tube.
Figure 5:
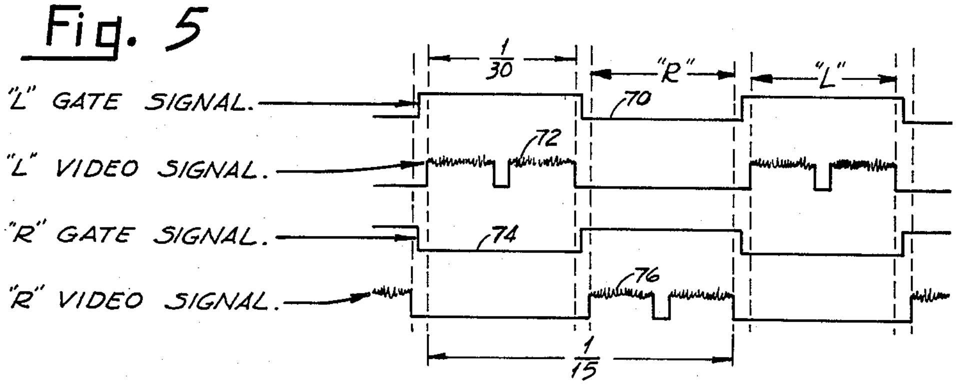

In FIG. 2, there is shown a system for displaying the composite images as generated by the system shown in FIG. 1. In particular, there is shown a binocular viewing hood 60 terminating in a pair of video viewing tubes 62 and 64 each disposed to have displayed left and right hand images as generated by the transmitting system. The usual scanning circuits and video circuits for developing the images are associated with each of the respective viewing tubes with the exception that specialized gating circuits are connected to the viewing tubes so as to obtain the proper left and right images on each of the respective left and right viewing tubes. This is accomplished by driving a pair of cathode follow circuits 66 and 68, each respectively connected to the cathodes of left and right viewing tubes, with 30 cycle gating signals as developed by a 30 cycle multivibrator circuit. The multivibrator circuit is made to oscillate at a 30 cycle rate and synchronized with the standard power lines, the same which feeds the transmission end, thereby maintaining a constant phase relationship with the transmitted signals. FIG. 5 shows a timing diagram of the video and gate signals as developed in the receiving system. The multivibrator 30 cycle signal 70 is first used to gate left viewing tube to permit the left video signal 72 to be displayed on the left viewing tube. This display is effected for a period of 1/30 second. Subsequently the 30 cycle gating signal 74 is used to gate the right viewing tube to permit the right video signal 76 to be displayed on the right viewing tube. The combined or composite video signal is then viewed by the viewer. Since the tubes are scanned by the same deflection circuits, differences in the geometric rendition are held to a minimum. The elapsed time for one complete three-dimensional frame is 1/15 second; therefore, the combination of the tube's phosphor and optical filters are chosen to eliminate 15 cycle flicker.

Figure 6:
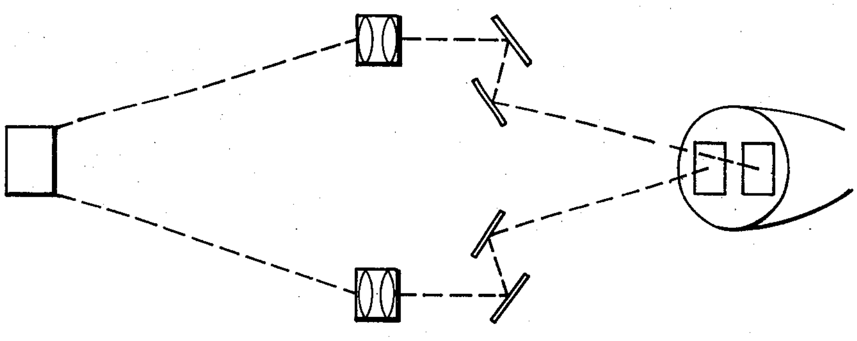
FIG. 6 shows another embodiment of the invention for developing three-dimensional images.

There is shown in FIG. 6 another embodiment of the invention and in particular involves an optical system 77 which projects the left and right images on the top and bottom halves of the image plane of the image orthicon tube. The beam paths 78, 79, are each interrupted by the shutter mechanism 34, 36 as shown in FIGURE 1 but not shown in FIGURE 6. This particular technique reduces the vertical field of view by 50% thus resulting in an aspect ratio of 4 to 1.5. However, this ratio can be made 2 to 1 by equalizing the horizontal and vertical dejection amplitude to obtain a one-to-one (1:1) raster. The two pictures when observed together produce a three-dimensional picture free of incremental image displacements caused by horizontal non-linearity. Image divergence in the vertical axis is insignificant and difficult to perceive since the vertical deflection current is kept extremely linear by ordinary current feedback circuitry.

The invention as described in the various embodiments may be modified in part without detracting from the true intent of the invention. Therefore, having described the invention what is claimed is:

1. In a three-dimensional television system for transmitting and receiving picture images, the combination comprising light optical means for separating the picture image into left and right images, each representative of the said picture image, dual rotational apertured mechanical shutter means for sequentially accepting and rejecting alternately the said left and right images, image orthicon means for alternately receiving the said left and right images in response to the said rotational mechanical shutter means and converting the said images into respective image signals, means for transmitting the said respective image signals as a single composite video signal, means for receiving the said single composite video signal and separating from the said received composite video signal those signals representative of the said left and right images, means for converting the said image signals into left and right images and means for storing and viewing the said images to effect a three-dimensional single picture image.

2. In a three-dimensional television system according to claim 1 and wherein the said shutter comprises a pair of rotating discs mounted on a common motor driven shaft and each having respective wedge-shaped apertures representing less than 30 degrees, and space oriented from each other 180 degrees.

References Cited by the Examiner

UNITED STATES PATENTS

| | | | |
|---|---|---|---|
| 1,841,487 | 1/1932 | Lewis | 178—65 |
| 2,508,920 | 5/1950 | Kell | 178—6.5 |
| 2,571,612 | 10/1951 | Rines | 178—6.5 |
| 2,578,970 | 12/1951 | Gannaway | 178—6.5 |
| 2,665,335 | 1/1954 | Cahen | 178—6.5 |

DAVID G. REDINBAUGH, *Primary Examiner.*

ROBERT HESSIN, JOSEPH A. ORSINO, Jr., *Assistant Examiners.*